Aug. 17, 1965  G. F. HARTMAN  3,200,459
SWIVELS
Filed Oct. 19, 1962  2 Sheets-Sheet 1

INVENTOR.
GEORGE F. HARTMAN
BY Wynne & Finken
ATTORNEYS

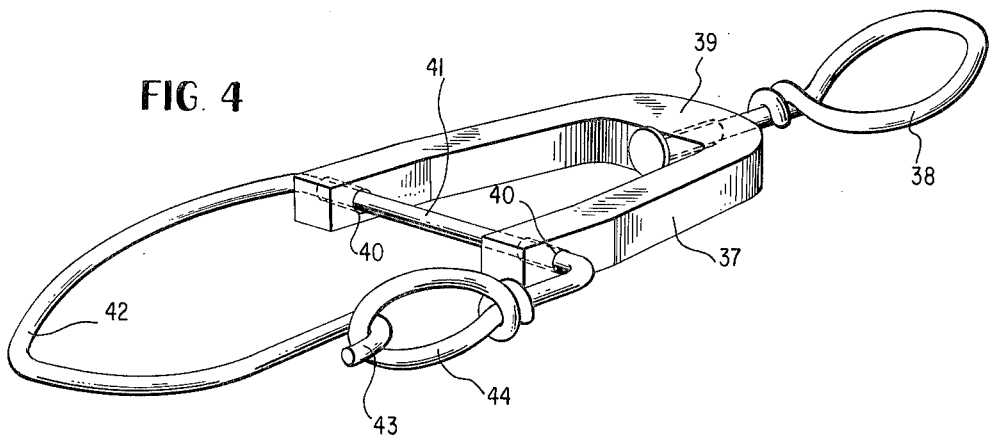
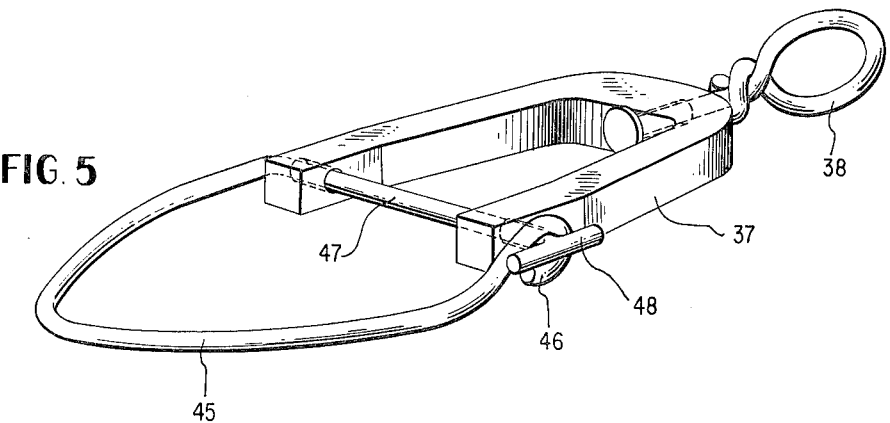
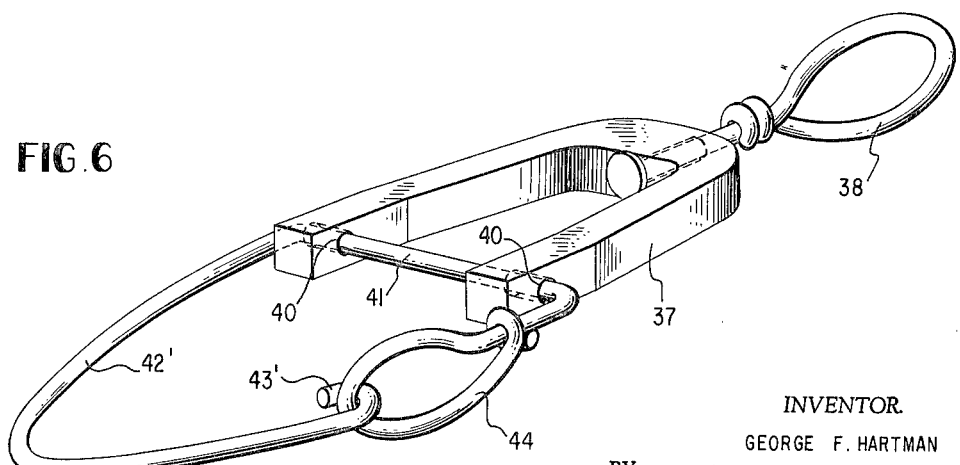

United States Patent Office 3,200,459
Patented Aug. 17, 1965

3,200,459
SWIVELS
George F. Hartman, Winter Park, Fla. (1413 Calle del Sol, Jardines del Bosque, Guadalajara, Jalisco, Mexico)
Filed Oct. 19, 1962, Ser. No. 231,617
7 Claims. (Cl. 24—73)

This invention relates to improvements in swivels of the class employed with fishing tackle.

Important objects of the invention are to provide improved swivel structures which have extremely low friction and which are shaped to minimize line twisting; swivels which are lightweight, non-corrosive and inconspicuous in the water; swivels which are highly resistant to corrosion, substantially self-lubricating and self-cleaning, and which are economical to manufacture from readily available materials and reliable and highly efficient in operation More particularly, it is the primary object of the invention to provide swivels having body portions which are formed of tough preferably translucent thermoplastic organic synthetic resin, such as nylon or the like, well adapted to be molded into the desired shape or shapes.

Other objects and advantages of the invention will be apparent during the course of the following description.

In the accompanying drawings forming a part of this application and in which like numerals are employed to designate like parts throughout the same, FIGURE 1 is a perspective view on a greatly enlarged scale of a fishing tackle swivel according to one preferred embodiment of the invention;

FIGURE 4 is a further perspective view of a snap type swivel according to another modification;

FIGURE 5 is a similar view of a further modified form of snap swivel; and

FIGURE 6 is a similar view of still another modified form of snap swivel embodying the invention.

Figure 1:
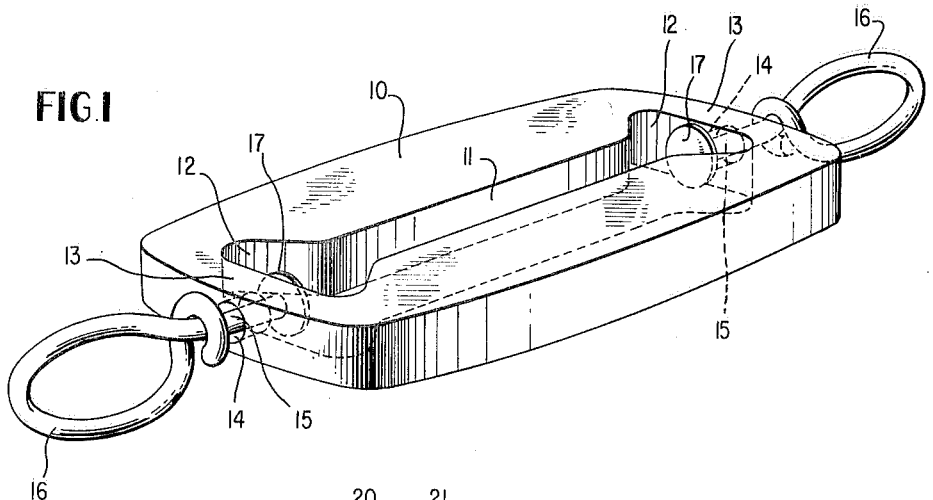

In the drawings, wherein for the purpose of illustration are shown preferred embodiments of the invention, attention is directed first to FIGURE 1, wherein the numeral 10 designates a swivel body portion formed entirely of tough translucent thermoplastic organic synthetic resin, such as nylon, preferably by molding, so as to produce a plate-like structure which is unitary, smooth surfaced and accurately shaped. The molded body portion 10 as shown in FIGURE 1 is oblong and generally rectangular and has uniform thickness materially less than its width or length. The relatively wide parallel flat faces of the body portion 10 produce a planning effect during movement through the water which tend to resist rotation of the swivel body portion and therefore minimizes twisting of the fishing line.

The body portion 10 is preferably provided with a central elongated longitudinal slot 11 having end enlargements 12 forming transverse bars 13 at the opposite ends of the body portion, such bar having longitudinally aligned through openings 14 for the reception of shanks 15 of attaching eyes 16 formed of non-corrosive wire or the like. The shanks 15 have preferably a loose fit within the openings 14 for free rotational movement therein and the inner ends of the shanks are headed as at 17 inwardly of the bar portions 13 to limit axial movement of the eyes 16 relative to the swivel body portion. If preferred, the eyes 16 may also be formed of sufficiently stiff non-metallic material including certain plastics materials.

As is well known, the fishing line is attached to one of the eyes 16 during the use of the swivel and a leader or other fishing tackle is attached to the other eye 16.

The primary purpose of the swivel is to eliminate excessive twisting of the line, and the swivel additionally possesses the advantages already enumerated in the introductory portion of the specification. The body portion 10 is lightweight and almost invisible in the water and the material from which it is constructed is tough, durable and possesses ideal wearing and self-lubricating properties. It is unaffected by salt water and is highly resistant to corrosion in general and has ideal low friction bearing characteristics in direct contact with metal.

Figure 2:
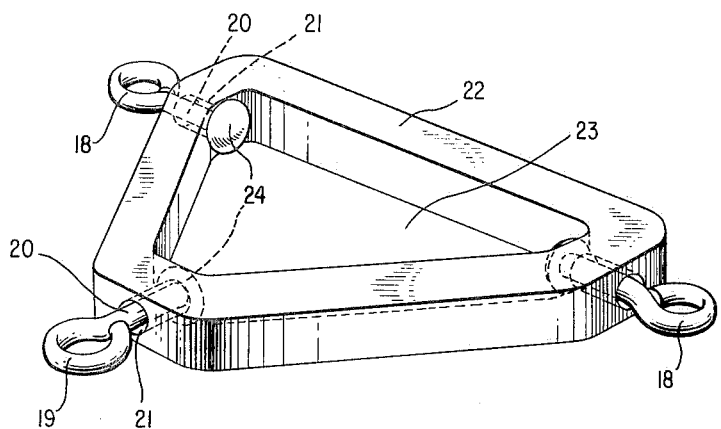
FIGURE 2 is a similar view of a three-way swivel according to a modification of the invention.

FIGURE 2 illustrates a three-way swivel of the type employed for surf fishing and having two attaching eyes 18 in alignment for attachment to a fishing line and sinker respectively. A third attaching eye 19, midway between and at right angles to the common axis of the eyes 18 is provided on the swivel for attaching the leader and bait. The several eyes 18 and 19 have shanks 20, loosely received in through openings 21 near the three corners of a three-sided generally triangular broad unitary swivel body portion 22, also formed of molded nylon or the like. A large opening 23 is formed through the body portion 22 rendering the three sides thereof relatively slender and elongated or bar-like, and the body portion is preferably rectangular in cross section imparting to the same flat parallel opposite faces to produce a planing action and resistance to rotation in the water. The inner ends of the eye shanks 20 have enlarged heads 24, as shown, resisting axial displacement of the shanks and eyes. The use of the three-way swivel is well known to those skilled in the art and need not be discussed further herein.

Figure 3:
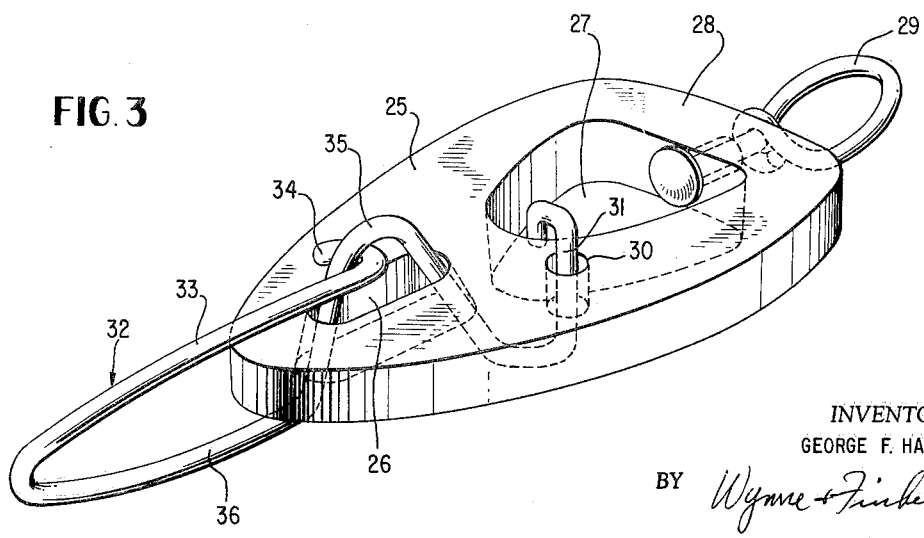
FIGURE 3 is a perspective view of a snap type swivel embodying another modification of the invention.

FIGURE 3 illustrates a snap type swivel having means to facilitate the quick attachment or detachment of a lure or other bait at one end thereof and means to attach the fishing line at its opposite end. This snap type swivel comprises a preferably molded nylon plate-like body portion 25 which is generally oval-shaped and tapered toward one end thereof and having opposite broad flat parallel faces for the purposes above mentioned. The body portion 25 is provided near its tapered end with a slot 26 formed entirely therethrough and a separate relatively large opening 27 is formed through the body portion near and inwardly of its broader end and forms at such end a transverse bar-like section 28 for the mounting of the line attaching eye 29 in the same manner above described in connection with FIGURES 1 and 2.

A small opening 30 is formed through the body portion 25 near the leading end of the opening 27 and adjacent one side thereof and toward one side of the body portion. This opening receives an anchoring extension 31 of a preferably non-corrosive wire lure attaching clasp or clip 32 which is resilient and generally V-shaped and projects in loop form forwardly of the tapered end of body portion 25 in a plane substantially at right angles to the major plane of the body portion. The resilient arm 33 of clasp 32 terminates in a hook 34 detachably engageable with an upstanding loop portion 35 which projects upwardly through the slot 26 and has its lower ends secured integrally to the lower arm 36 of the clasp 32 and the lower end of anchoring extension 31 respectively, both of these last-named connections being below the lower face of body portion 25, as viewed in FIGURE 3.

Due to the arrangement of the anchoring extension 31 in opening 30 and the loop portion 35 in slot 26, there is no appreciable pivotal movement of the clasp 32 relative to the nylon body portion 25, and in this form of the invention, the clasp for attaching a lure or the like is generally rigid with the swivel body portion. The clasp 32 is obviously very easy to manipulate for attaching or releasing lures or other bait and increased tension on the tackle attached to the clasp 32 tends to secure the clasp more firmly at the hook 34 rather than to open the clasp.

FIGURES 4–6 inclusive illustrate modified forms of snap swivels, all of which forms are broadly similar. In FIGURE 4, a generally U-shaped molded nylon body portion 37 has a line attaching eye 38 freely rotatably secured within an opening in the bight portion 39 thereof in the identical manner previously described. The arms of the body portion 37 are provided near their free ends with aligned transverse openings 40, receiving therethrough rotatably a transverse bar 41, having one end integral with a generally U-shaped resilient clasp 42 having a hook extension 43 on the remote end thereof, for detachable connection with an eye 44 carried by the other end of transverse bar 41.

In FIGURE 4, as distinguished from FIGURE 3, the clasp 42 for the attachment of lures and the like lies in the major plane of the U-shaped body portion 37 and is freely pivoted thereto on the transverse axis of the bar 41, whereas in FIGURE 3, the clasp 32 lies normal to the plane of body portion 25 and is substantially rigid therewith.

The modifications shown in FIGURES 5 and 6 are only slightly different from FIGURE 4. In FIGURE 5, the identical body portion 37 and line attaching eye 38 may be employed. The pivotal clasp 45 in FIGURE 5 similar to the clasp 42 has a hook 46 at one end thereof engageable directly with the end portion of a transverse bar 47 having a head 48 on one end thereof adjacent to and outwardly of one side or arm of the body portion 37. As in FIGURE 4, the bar 47 is freely rotatable within aligned openings in the nylon body portion and is secured integrally to one side of the resilient clasp or loop 45. The hook 46 is readily detachable from the bar 47, and in both FIGURES 4 and 5 an increased tension on the clasps 42 and 45 will tend to further tighten or secure the hooks 43 and 46, which is an advantageous feature.

The modification of the swivel shown in FIGURE 6 differs from the modification of FIGURE 4 in one material respect only, namely, that the resilient clasp 42' in FIGURE 6 is outwardly opening relative to the eye 44 rather than inwardly opening as in FIGURE 4, and to facilitate this, the hook 43' of the clasp 42' is reversely directed as compared to the hook 43.

All of the snap swivels illustrated in FIGURES 4–6 possess the same major advantages over all-metal swivels previously enumerated at the beginning of the specification and more particularly in connection with the first-described modification of FIGURE 1.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described my invention, I claim:

1. A swivel structure of the type employed to connect fishing tackle with a fishing line and to prevent twisting of said line comprising a body portion of molded, tough, translucent, thermoplastic organic synthetic resin having lubricating properties, said body portion being substantially flat and relatively large in the area which it spans in one plane and being relatively narrow in a plane at right angles to said one plane, said body portion having an opening at one end thereof, a metallic attaching eye having a shank portion rotatably positioned within said opening, said shank having a head on the end thereof remote from the eye presenting a bearing surface for engagement with the body portion adjacent said opening, and at least one second attaching element connected with said body portion at an opposite extremity thereof from said attaching eye.

2. The invention defined by claim 1 wherein said body portion comprises molded nylon.

3. The invention defined by claim 1 wherein said body portion has a second opening at the end opopsite said first opening, and a second metallic attaching eye having a shank portion rotatably positioned within said opening, said shank having a head on the end thereof remote from the eye presenting a bearing surface for engagement with the body portion adjacent said second opening.

4. The invention defined by claim 1 wherein said second attaching element comprises a clasp.

5. The invention defined by claim 4 wherein said clasp is pivotally attached to said body portion.

6. The invention defined by claim 4 wherein said body portion is generally U-shaped, said attaching eye is positioned at the bight of the U and the clasp is positioned adjacent both ends of the legs of the U.

7. The invention defined by claim 6 wherein said clasp is pivotally attached to the legs of the U.

References Cited by the Examiner

UNITED STATES PATENTS

| | | | |
|---|---|---|---|
| 1,113,256 | 10/14 | Smith | 287—91 |
| 1,688,293 | 10/28 | Barrett | 59—95 |
| 1,858,550 | 5/32 | Kahle | 24—237 |
| 2,085,320 | 6/37 | Kolstrand | 59—95 |
| 2,139,294 | 12/38 | Weigant | 59—95 |
| 2,198,092 | 4/40 | Schor et al. | 24—236 |
| 2,423,050 | 6/47 | Rundell | 59—95 |
| 2,720,014 | 10/55 | Caldwell | 24—237 |
| 2,739,408 | 3/56 | Eatinger | 59—95 X |
| 2,784,519 | 3/57 | Ralston et al. | 43—44.83 |
| 3,023,535 | 3/62 | Holka et al. | 43—49.85 |
| 3,032,910 | 3/62 | Crossan | 43—43.13 |
| 3,051,318 | 8/62 | Murphy | 16—87.4 |

WILLIAM FELDMAN, *Primary Examiner.*

ABRAHAM G. STONE, DONLEY J. STOCKING,
*Examiners.*